Patented Oct. 19, 1943

UNITED STATES PATENT OFFICE 2,331,993

PROCESS OF MAKING SUBSTITUTED DIOXANES

Louis G. MacDowell, Lakeland, Fla., and Henry C. Chitwood, Charleston, W. Va., assignors to Carbide and Carbon Chemicals Corporation, a corporation of New York No Drawing. Application June 17, 1942, Serial No. 447,454

7 Claims. (Cl. 260—338)

This invention pertains to a new and improved method for making diethers, and more particularly dialkyl ethers, of 2,3-dihydroxydioxanes. These latter compounds constitute a useful class of solvents and plasticizers for synthetic resins and cellulose derivatives.

Known methods for making diethers of 2,3-dihydroxydioxane involve heating 2,3-dichlordioxane with alcohols. This invention has for its object the preparation of such substituted dioxanes by a condensation reaction which does not employ a chlorinated dioxane as a starting material. The process of this invention comprises heating glyoxal, or its hydrates, polymers, hydrated polymers or dehydrated polymeric hydrates, with a 1,2-alkylene glycol and a monohydric alcohol under such conditions that water is split out in a condensation reaction. The over-all reaction which occurs may be illustrated by the following scheme, where R is the residue of an aliphatic or aromatic monohydric alcohol and $R_1$ is hydrogen or a lower alkyl group:

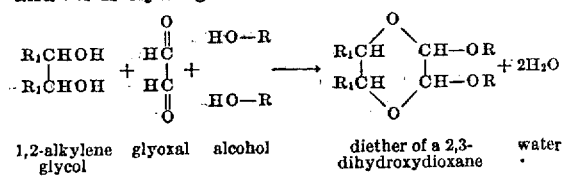

1,2-alkylene glycol + glyoxal + alcohol → diether of a 2,3-dihydroxydioxane + water (+2H₂O)

The reaction is preferably carried out with moderate heating of the reactants in the presence of an acid catalyst, such as sulfuric acid, and with the assistance of a suitable azeotropic agent, such as benzene, toluene, xylene or diisopropyl ether, for the removal of the water formed in the condensation. The water may also be removed by distillation of the reactants under a vacuum. When approximately the theoretical amount of water has been removed, the catalyst is neutralized, and the products are isolated by distillation.

Typical alcohols which may be employed in the reaction are aliphatic alcohols, such as methyl, ethyl, chlorethyl, isopropyl, butyl, amyl, 2-ethylbutyl and 2-ethylhexyl alcohols; acoholethers, such as methoxyethanol, ethoxyethanol, and butoxyethanol; and aromatic alcohols, such as benzyl alcohol, phenyl ethyl carbinol, and phenylethyl alcohol. The 1,2-akylene glycols which may be used include ethylene, propylene and 2,3-butylene glycols. Ethylene glycol is preferred.

Glyoxal is most readily obtainable in association with water. When glyoxal in this form is employed, the reactions involved in the production of the 2,3-dialkoxydioxanes may be complex. Glyoxal forms a hydrate with water, but the exact constitution of this hydrate is not known. It is probable that in the presence of water the simplest hydrates

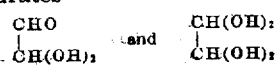

are in equilibrium with cyclic polymeric hydrates. Upon distilling water from mixtures of these hydrates, it is probable that partially dehydrated polymeric hydrates are formed. Upon the addition of an alkylene glycol and a monohydric alcohol to a mixture containing any of these glyoxal hydrates, a number of products theoretically may be formed, and many will occur in small amounts as by-products.

This invention is predicated on the discovery that, on heating such alkylene glycol-monohydric alcohol-glyoxal-water mixtures with removal of the water of reaction, condensation of glyoxal or its hydrates will occur with both the alkylene glycol and the monohydric alcohol according to the over-all reaction illustrated above. The removal from the zone of reaction of the water split out in the condensation will cause the reaction to go to completion. To avoid the formation of by-products, it is desirable to employ equal molar quantities of the glycol and the glyoxal, and at least two molar quantities of the alcohol. Under these conditions, yields of the desired dialkoxydioxanes as high as 60% have been obtained. Such by-products as may occur include glyoxal tetra-acetals formed from the reaction of the aldehyde radicals of the glyoxal with the hydroxyl group of the alcohol, and high-boiling acetals formed by the reaction of the alcohol with polymeric glyoxal hydrates. The by-products need not be discarded, however, since they may be reacted in the presence of an acid catalyst with the glycol and the monohydric alcohol to produce additional dialkoxydioxanes. Under acid conditions, the acetal by-products may liberate glyoxal or its hydrates, and the reaction may proceed in the manner described above.

The examples to follow will serve to illustrate the invention.

Example 1

Four hundred sixty-four (464) grams of a 50% aqueous solution of glyoxal (containing 4 mols of glyoxal in the form of its hydrates), 248 grams (4 mols) of ethylene glycol, 592 grams (8 mols) of n-butanol, 1000 c. c. of benzene, and 1 c. c. of concentrated sulfuric acid were heated in a distilling flask under reflux. Water was removed from the reaction zone as an azeotropic distillate with the benzene, and the benzene was separated from this distillate and returned to the reaction flask. After 375 grams of water had been removed, indicating that 143 grams (8 mols) of water had been formed in the reaction, the sulfuric acid catalyst was inactivated by the addition of 5 grams of anhydrous sodium acetate, and the reaction products were separated by distillation. A 60.2% yield of 2,3-di-n-butoxydioxane was obtained. A purified fraction of this material boiled at 135° to 136° C. at 10 mm., and had a specific gravity of 0.985 at 20° C. and a refractive index of 1.4365 at 19.5° C. Its molecular weight, computed from the molecular refractivity, was 233 as compared to a theoretical value of 232 for 2,3-di-n-butoxydioxane. The material was useful as a solvent and plasticizer.

*Example 2*

One hundred forty-three (143) grams of an 81% aqueous solution of glyoxal (containing 2 mols of glyoxal in the form of its hydrates), 124 grams (2 mols) of ethylene glycol, 1610 grams (20 mols) of $\beta$-chlorethyl alcohol, 350 c. c. of benzene, and 0.5 c. c. of concentrated sulfuric acid were added to a flask having a distilling column. The mixture was heated under reflux for 11 to 12 hours, during which time the water was removed as an azeotropic distillate with the benzene. After distillation of the water had ceased, 2 grams of potassium acetate were added to react with the acid catalyst, and the reaction products were separated by distillation. A 42.7% yield of 2,3-di($\beta$-chlorethoxy) dioxane boiling at 151°–153° C. at 10 mm. was obtained. This chlorinated ether is of value as a solvent and as an extractant for oils.

In the appended claims, the term "glyoxal" is intended to include all glyoxal equivalents which react like glyoxal, such as the hydrates, polymers, hydrated polymers, and dehydrated polymeric hydrates of glyoxal. The molar ratios specified in the annexed claims are based on the aldehyde reactivity of these glyoxal equivalents, computed as monomeric glyoxal.

We claim:

1. Process for making diethers of 2,3-dihydroxydioxanes which comprises simultaneously condensing glyoxal with a monohydric alcohol and a 1,2-alkylene glycol, and removing water from the zone of reaction.

2. Process for making a diether of 2,3-dihydroxydioxane which comprises simultaneously heating glyoxal with a monohydric alcohol and a 1,2-alkylene glycol, forming said diether by a condensation reaction in which water is split out, and removing this water from the zone of reaction.

3. Process for making aliphatic diethers of 2,3-dihydroxydioxanes which comprises simultaneously condensing glyoxal with an aliphatic monohydric alcohol and a 1,2-alkylene glycol, and removing water from the zone of reaction.

4. Process for making 2,3-dialkoxydioxanes which comprises simultaneously condensing glyoxal with an aliphatic monohydric alcohol and ethylene glycol in the presence of a water-immiscible liquid, and removing the water formed in the condensation as an azeotropic distillate with said liquid.

5. Process for making 2,3-dialkoxydioxanes which comprises simultaneously condensing glyoxal with an aliphatic monohydric alcohol and a 1,2-alkylene glycol, the molar ratio of the alcohol to glyoxal being not less than about two, splitting out water in the condensation, and removing this water from the zone of reaction.

6. Process for making diethers of 2,3-dihydroxydioxanes which comprises simultaneously condensing glyoxal with a monohydric alcohol and a 1,2-alkylene glycol in the presence of an acid catalyst; the molar ratio of glyoxal to the glycol being approximately one and the molar ratio of the monohydric alcohol to glyoxal being not less than about two; splitting out approximately two mols of water per mol of glyoxal in the condensation, and distilling this water from the zone of reaction.

7. Process for making 2,3-dibutoxydioxane which comprises simultaneously condensing glyoxal with butanol and ethylene glycol, and removing water from the zone of reaction.

8. Process for making 2,3-di($\beta$-chlorethoxydioxane) which comprises simultaneously condensing glyoxal with $\beta$-chlorethyl alcohol and ethylene glycol, and removing water from the zone of reaction.

LOUIS G. MacDOWELL.
HENRY C. CHITWOOD.